(12) United States Patent
Navratil et al.

(10) Patent No.: US 9,665,562 B1
(45) Date of Patent: *May 30, 2017

(54) AUTOMATIC COGNATE DETECTION IN A COMPUTER-ASSISTED LANGUAGE LEARNING SYSTEM

(71) Applicant: INTERNATIONAL BUSINESS MACHINES CORPORATION, Armonk, NY (US)

(72) Inventors: Jiri Navratil, Cortlandt Manor, NY (US); Salim Roukos, Scarsdale, NY (US); Robert T. Ward, Croton on Hudson, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/189,321

(22) Filed: Jun. 22, 2016

Related U.S. Application Data (63) Continuation of application No. 15/018,014, filed on Feb. 8, 2016, now Pat. No. 9,400,781.

(51) Int. Cl.
*G06F 17/27* (2006.01)
*G06F 17/28* (2006.01)
(Continued)

(52) U.S. Cl.
CPC .......... *G06F 17/277* (2013.01); *G06F 17/274* (2013.01); *G06F 17/2705* (2013.01);
(Continued)

(58) Field of Classification Search
CPC ............. G06F 17/2836; G06F 17/2818; G06F 17/2827; G06F 17/2795; G06F 17/2705; G06F 17/274
See application file for complete search history.

(56) References Cited

U.S. PATENT DOCUMENTS

| | | | | |
|---|---|---|---|---|
| 2004/0172235 A1* | 9/2004 | Pinkham | ............... | G06F 17/271 704/2 |
| 2014/0244235 A1* | 8/2014 | Michaelis | ........... | H04L 12/1827 704/2 |
| 2016/0042359 A1* | 2/2016 | Singh | ................... | G06Q 30/016 704/2 |

OTHER PUBLICATIONS

V.M. Bilbao et al., "Measuring the impact of cognates in parallel text alignment", in Portuguese Conference on Artificial Intelligence, IEEE, Dec. 5-8, 2005, p. 338-343.*

(Continued)

*Primary Examiner* — Eric Yen
(74) *Attorney, Agent, or Firm* — Cantor Colburn LLP; Kurt Goudy

(57) ABSTRACT

According to an aspect, a first word in a first language and a second word in a second language in a bilingual corpus are stemmed. A probability for aligning the first stem and the second stem and a distance metric between the normalized first stem and the normalized second stem are calculated. The first word and the second word are identified as a cognate pair when the probability and the distance metric meet a threshold criterion and stored as a cognate pair in a set of cognates. A candidate sentence in the second language is retrieved from a corpus. The candidate sentence is filtered by the active vocabulary of a user in the second language and the set of cognates. A sentence quality score is calculated for the candidate sentence; and the candidate sentence is ranked for presentation to the user based on the sentence quality scorer.

18 Claims, 4 Drawing Sheets

(51) Int. Cl.
   *G06F 17/30* (2006.01)
   *G10L 15/10* (2006.01)
   *G10L 15/08* (2006.01)

(52) U.S. Cl.
   CPC ...... *G06F 17/2715* (2013.01); *G06F 17/2795* (2013.01); *G06F 17/289* (2013.01); *G06F 17/2827* (2013.01); *G06F 17/2836* (2013.01); *G06F 17/30719* (2013.01); *G10L 15/10* (2013.01); *G06F 17/2818* (2013.01); *G10L 2015/081* (2013.01)

(56) References Cited

OTHER PUBLICATIONS

List of IBM Patents or Patent Applications Treated as Related; (Appendix P), Date Filed Jun. 22, 2016; 2 pages.
U.S. Appl. No. 15/018,014, filed Feb. 8, 2016; Entitled: Automatic Cognate Detection INA Computer-Assisted Language Learning System.

* cited by examiner

AUTOMATIC COGNATE DETECTION IN A COMPUTER-ASSISTED LANGUAGE LEARNING SYSTEM

DOMESTIC PRIORITY

This application is a continuation application of the legally related U.S. Ser. No. 15/018,014 filed Feb. 8, 2016, the contents of which are incorporated by reference herein in their entirety.

BACKGROUND

The present invention relates generally to automatic cognate detection and, more specifically, to automatic cognate detection in a computer-assisted language learning system.

Knowledge of a second language can be desirable for a variety of reasons. Individuals may desire to learn a second language to satisfy personal or career goals. Current techniques for computer-assisted language learning (CALL) include approaches such as translation and transcription exercises, simulated dialogue, reading in the target language, or reading parallel language texts. Generally speaking, these techniques present some sort of pure or combined audio, graphic, textual, or video stimulus to which the learner is to respond using speech, writing, or menu selections.

Contemporary linguistics research shows that language learning is strongly facilitated by the use of the target language in interactions where the learner can negotiate the meaning of vocabulary and that the use of words in new contexts stimulates a deeper understanding of their meaning. A challenge in systems for CALL relates to curation of learning material, namely how to select content most appropriate for a user. Typically, this is done manually by an instructor. Automatic data curation via retrieval from large mono- or multi-lingual archives is an emerging approach.

Natural-language processing (NLP) techniques infer the meaning of terms and phrases by analyzing their syntax, context, and usage patterns. Human language is so complex, variable (there are many different ways to express the same meaning), and polysemous (the same word or phrase may mean many things in different contexts) that NLP presents an enormous technical challenge. Decades of research have led to many specialized techniques each operating on language at different levels and on different isolated aspects of the language understanding task.

SUMMARY

Embodiments include a method, system, and computer program product for automatic cognate detection. A method includes stemming, by a processor, a first word in a first language in a bilingual corpus to obtain a first stem and a second word in a second language in the bilingual corpus to obtain a second stem. A probability for aligning the first stem and the second stem is calculated by the processor. The first stem and the second stem are normalized by the processor. A distance metric between the normalized first stem and the normalized second stem is calculated by the processor. The first word and the second word are identified by the processor as a cognate pair when the probability and the distance metric meet a threshold criterion and stored in a set of cognates. The method can further include retrieving, by the processor, a candidate sentence in the second language from a bilingual corpus. The candidate sentence is filtered by the processor by a user's active vocabulary in the second language and the set of cognates. A sentence quality score is calculated by the processor for the candidate sentence; and the candidate sentence is ranked for presentation to the user based on the sentence quality score by the processor.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

A challenge in systems for computer-assisted language learning (CALL) relates to curation of learning material, namely how to select content most appropriate for a user. Typically, this is done manually by a teacher/coach. Automatic data curation via retrieval from large mono- or multi-lingual archives is an emerging approach. However, for such an approach, appropriate steps to prioritize content with respect to the user's knowledge as well as other criteria such his/her other language skills (native language, other foreign languages) need to be implemented.

Embodiments disclosed herein relate to a method that addresses an aspect of prioritization of content by applying an automatic detection of words in the target language lexicon that are related in their origin to words already known to the user. Such words across different languages are referred to as cognates. The methods involve measuring the cognate content in potential learning material and prioritizing such material based on a criterion of expected ease of learning for a given user.

Herein, the term "cognate" or "cognate pair" refers to pairs of words from two different languages that are perceived as similar and have the same meaning in both languages in some, although not necessarily all, contexts.

Figure 1:
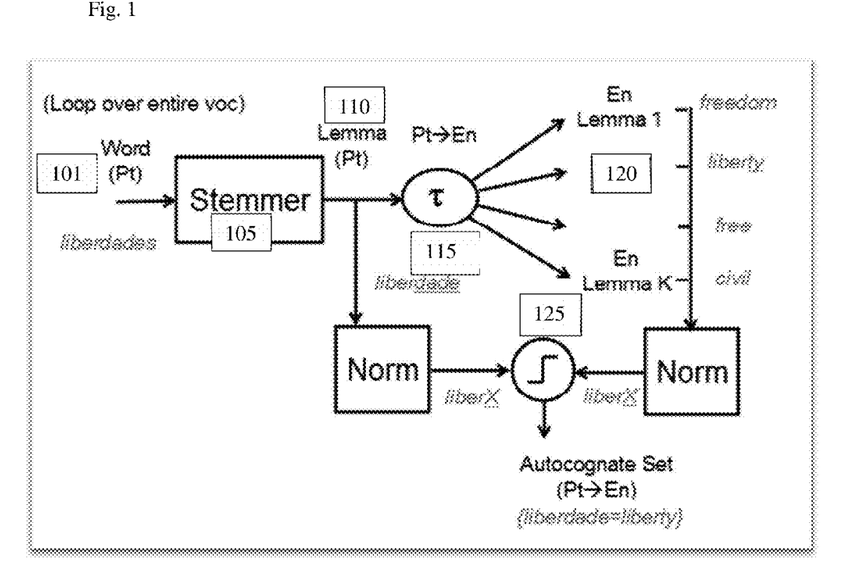
FIG. 1 depicts a block diagram of operations for a process for automatic cognate detection in accordance with exemplary embodiments of this disclosure.

Turning now to FIG. 1, a schematic diagram of an example of operations for a process for automatic cognate detection is shown in general accordance with an embodiment.

In the embodiment of FIG. 1, a bilingual corpus comprises Portuguese (Pt) and English (En) as the two languages. A word (Pt) 101 is input into a stemmer 105 which outputs a stem, Lemma (Pt) 110, for the word (Pt) 101. All words in the vocabularies for each of the languages are input into stemmer 105 and stemmed. Probabilities ($\tau$) 115 are calculated by a processor for the pairwise alignment of Lemma (Pt) 110 with each of K stems for English words (K En Lemma 120). A suffix/prefix normalized distance metric 125 is also calculated for each pairwise alignment of Lemma (Pt) 110 with one of the K En Lemmas 120. A Pt-En pair of words is identified as a cognate pair when the probability (τ) 115 and the normalized distance metric 125 for the pair of words meets a threshold criterion. This process is performed for the entire vocabulary in the bilingual corpus.

The terms stemming or lemmatization refer herein to the process for reducing inflected or variant forms of a word to its word stem ("root", "base", or "lemma" form). Two examples of sets of inflected word forms and their common base form are the following:

am, are, is=be arm, arms, arm's, armed=arm.

The stemmer 105 can be programmed to perform any stemming algorithm. An embodiment of the stemmer 105 can use a stemming algorithm in which a predetermined list of language-specific rules provides a path for the algorithm, given an input word, to find the root form of the input word. An example of a rule for stemming an English word is 'if a word with a vowel ends in "ing" (*v*ing), remove the "ing"'. The predetermined language-specific rules for the first and second language are developed by humans, e.g., linguists, and implemented in the stemmer 105. An embodiment of the stemmer 105 can use machine-learned rules in the stemming algorithm. For machine-learned rules, a training data set of words and corresponding stems for each language of the bilingual corpus is used in an initial machine learning process to discover stemming rules for each language for subsequent application in the stemming algorithm implemented in stemmer 105. Examples of stemming algorithms for English include the Porter algorithm, the Lovins stemmer, and the Paice/Husk stemmer. Stemming algorithms for non-English languages are also known using either predetermined rules or machine-learned rules. For example the Euroling Stemmer (predetermined rules) and the CST Lemmatizer (machine-learned rules) have both been used in stemming Nordic languages. In an embodiment of stemmer 105, a combination of human-developed predetermined rules and machine learned rules are used in the algorithm.

In an embodiment, using the stemmed vocabulary of each language in the bilingual corpus, a probability is calculated by the processor for the pairwise alignment of each stemmed word in the first language with each stemmed word in the second language. As represented in the embodiment depicted in FIG. 1, a probability is calculated for the pairwise alignment of Lemma (Pt) 110 with each K En Lemma 120. In an embodiment, the probability for each pairwise alignment can be calculated as a Viterbi tau probability. In an embodiment, the probability for each pairwise alignment can be calculated using an expectation-maximization algorithm. The calculated probabilities for each pairwise lemma alignment can be stored in a table.

A suffix/prefix normalized distance metric 125 is calculated by the processor for each pairwise alignment of stems. In the embodiment of FIG. 1, a suffix/prefix normalized distance metric 125 is calculated for the pairwise alignment of Lemma (Pt) 110 with each one of the K En Lemmas 120. The distance metric is a measure of the similarity between the two aligned lemmas. In an embodiment, the distance metric can include an edit distance. The minimum edit distance between two aligned lemmas is the minimum number of editing operations needed to transform one into the other. Examples of editing operations include insertion, deletion, substitution, and transposition. A common type of edit distance is the Levenshtein distance, in which the allowed operations are the deletion or insertion of a single character, or the substitution of one character for another, with each of these operations having a particular cost. Other variants of an edit distance include Longest Common Subsequence (LCS) distance and Jaro-Winkler distance. In an embodiment, the edit distance can be normalized by the length of the longer of the two aligned lemmas. The edit distance measure may be further generalized to include mapping between characters and groups of characters of two languages with different alphabets (such as English-Russian, English-Hindi, etc.). In this case a substitution may be assessed a variable penalty (cost) depending on the characters compared (for example an English "d" might be a good match to Russian "д", or letter "j" to "ж", but not "a" to "ж"). These costs can be automatically determined (learned) from bilingual corpora (for instance, name transliteration corpora) using standard methods of character-based statistical machine translation. Other variants of distance metrics include phonetically motivated transforms, whereby the candidate word in each language is first transformed into its phonetic (pronunciation) form by means of pronunciation rules, before being compared using an edit distance.

In the embodiment of FIG. 1, a pair of aligned lemmas is identified as a cognate pair by the processor when the probability 115 and the normalized distance metric 125 for the aligned pair meet a threshold criterion. The pair of aligned lemmas identified as a cognate pair is stored in a set of cognates by the processor. The threshold criterion can be a minimum normalized edit distance and a maximum probability for the aligned pair of lemmas.

Figure 3:
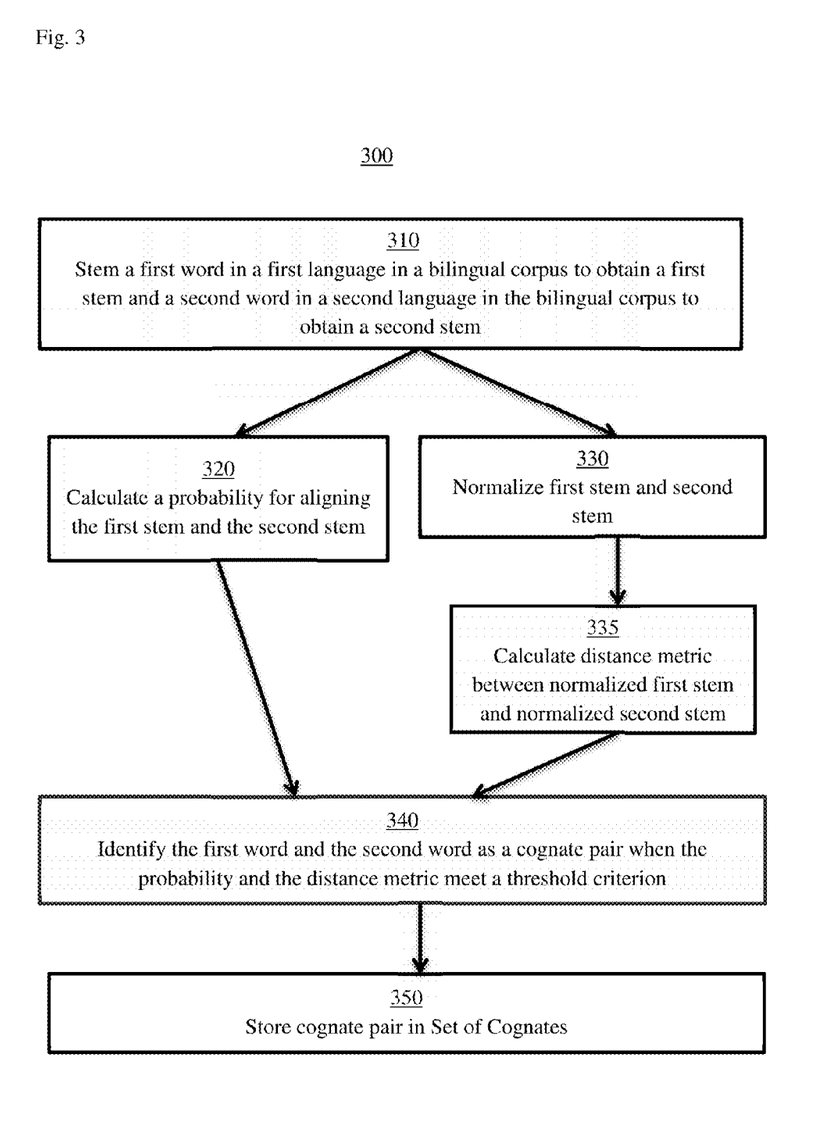
FIG. 3 is a flowchart of operations for a process for automatic cognate detection in accordance with exemplary embodiments of this disclosure.

FIG. 3 depicts a process flow 300 for automated cognate detection in accordance with an embodiment.

At block 310, the stemmer 105 can stem a first word in a first language in a bilingual corpus to obtain a first stem and a second word in a second language in the bilingual corpus to obtain a second stem.

At block 320, a probability is calculated by the processor for the aligned pair of stems. The probability can be calculated using a number of algorithms. In an embodiment, the probability is calculated as a Viterbi tau probability. In an embodiment, the probability is calculated using an expectation maximization algorithm.

At block 330, the first stem and second stem are normalized. The normalization can be suffix/prefix normalization. At block 335, a distance metric is calculated between the normalized first stem and normalized second stem. In an embodiment, the calculated distance metric is normalized. Normalization can be by the length (number of characters) of the longest normalized stem.

At block 340, the first word and the second word are identified as a cognate pair when the probability and the distance metric calculated for the aligned pair of stems meet a threshold criterion.

At block 350, the first word and the second word of the identified cognate pair are stored in a set of cognates for the two languages.

A corpus is a set of documents including text. The text can be present in a single language (monolingual corpus), in two languages (bilingual corpus), or in multiple languages (multilingual corpus). Publically available bilingual corpora exist for many language pairs. For example, the Association of Computational Linguistics (ACL) maintains lists of resources by individual languages as well as a list of multilingual and bilingual resources such as corpora of text.

Examples of such corpora include the European Parliament Proceedings Parallel Corpus 1996-2003 (with versions in 21 European languages) and the Tanaka Corpus (Japanese-English sentence pairs). The ACL also maintains a list of available multi- or bi-lingual dictionaries and affix files.

In an embodiment, the stored set of cognates can be further used in prioritizing candidate sentences for presentation to a user of a computer-assisted language learning (CALL) system to learn the second language. The user is fluent in the first language, or at least has greater fluency in the first language than in the second language that is being learned with the CALL system.

Figure 4:
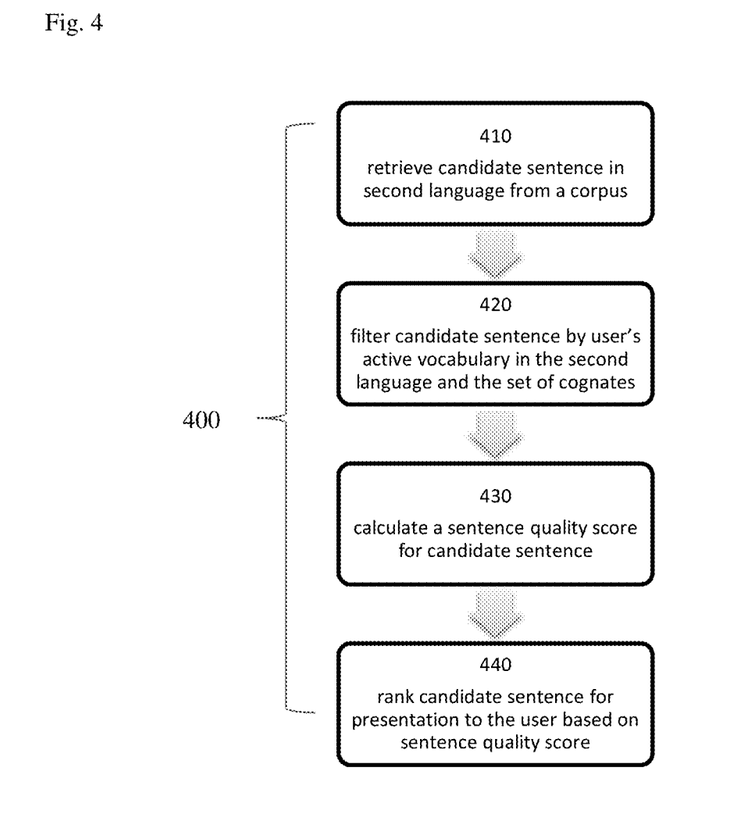
FIG. 4 is a flowchart of operations for ranking candidate sentences for appropriateness for a user in a CALL system in accordance with exemplary embodiments of this disclosure.

FIG. 4 depicts a process flow 400 for prioritizing candidate sentences for presentation to a user of a computer-assisted language learning (CALL) system to learn the second language in accordance with an embodiment.

In block 410, candidate sentences in the second language are retrieved from a corpus by the processor. The corpus from which a candidate sentence is retrieved can be the same or different from the bilingual corpus used to determine the set of cognates. A "candidate sentence" herein means a linguistic unit consisting of one or more words that are grammatically linked. The candidate sentence can be a single word, a phrase, a clause, or a complete sentence. A clause typically contains at least a subject noun phrase and a finite verb, and can be independent or subordinate. A complete sentence includes at least a single independent clause, but can include additional clauses.

In block 420, the candidate sentence is filtered by the set of cognates and by the user's active vocabulary in the second language. In an embodiment, filtering the candidate sentence can include flagging all words in the candidate sentence which are present in the set of cognates. In an embodiment, filtering the candidate sentence can include flagging all words in the candidate sentence which are present in the user's active vocabulary of the second language. In an embodiment, the user's active vocabulary in the second language can be determined by maintaining a list of words in the second language presented to the user in the CALL system and the frequency with which the user correctly identifies the meaning of each word. In an embodiment, active vocabulary of the user is estimated through simple frequency based sampling of the terms in the vocabulary of the second language. After presentation of words, the system determines whether or not the user is familiar with the word in terms of meaning. For example, a user may provide explicit feedback, i.e. be required to select input such as "known" and "unknown". Alternatively, the user may provide implicit feedback, through reading speed, correctness of translations, and the like. This process allows the system to estimate a recall probability for each word in the vocabulary of the second language. Words with an estimated recall probability meeting a predetermined threshold are deemed to be in the user's active vocabulary.

In block 430, the processor calculates a sentence quality score for the candidate sentence and, in block 440, ranks the candidate sentence for presentation (e.g., by display or output) to the user based on the sentence quality score. In an embodiment, the sentence quality score is based on one or more factors including user interest in the topic of the candidate sentence, richness in words stored in the set of cognates, richness in words in the user's active vocabulary in the second language, grammatical correctness, or parallelism.

Figure 2:
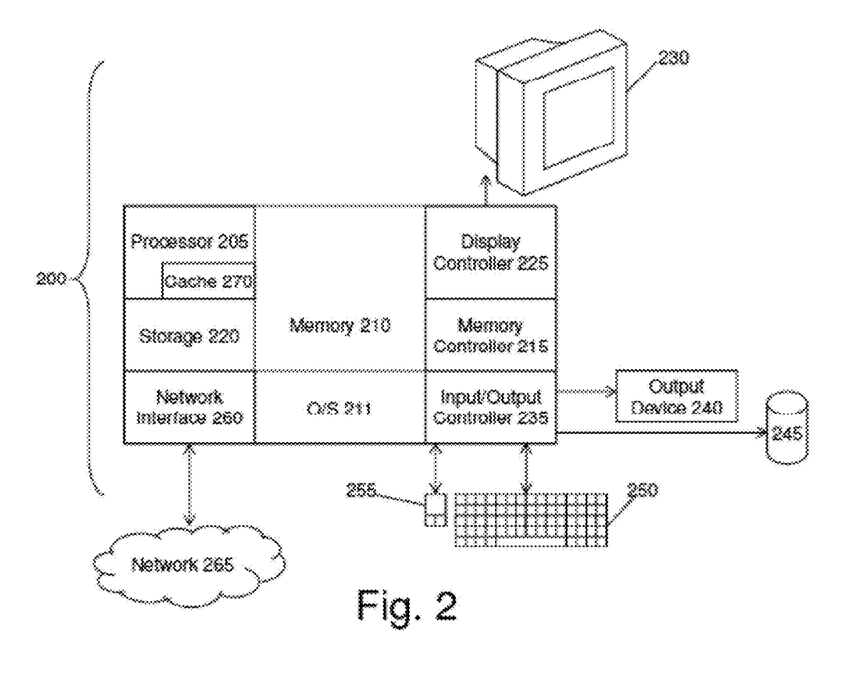
FIG. 2 depicts a block diagram of a computer system for implementing exemplary embodiments of this disclosure.

FIG. 2 illustrates a block diagram of a computer system 200 for use in implementing a system or method according to some embodiments. The systems and methods described herein may be implemented in hardware, software (e.g., firmware), or a combination thereof. In some embodiments, the methods described may be implemented, at least in part, in hardware and may be part of the microprocessor of a special or general-purpose computer system 200, such as a personal computer, workstation, minicomputer, or mainframe computer.

In some embodiments, as shown in FIG. 2, the computer system 200 includes a processor 205, memory 210 coupled to a memory controller 215, and one or more input devices 245 and/or output devices 240, such as peripherals, that are communicatively coupled via a local I/O controller 235. These devices 240 and 245 may include, for example, a printer, a scanner, a microphone, and the like. Input devices such as a conventional keyboard 250 and mouse 255 may be coupled to the I/O controller 235. The I/O controller 235 may be, for example, one or more buses or other wired or wireless connections, as are known in the art. The I/O controller 235 may have additional elements, which are omitted for simplicity, such as controllers, buffers (caches), drivers, repeaters, and receivers, to enable communications.

The I/O devices 240, 245 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 205 is a hardware device for executing hardware instructions or software, particularly those stored in memory 210. The processor 205 may be a custom made or commercially available processor, a central processing unit (CPU), an auxiliary processor among several processors associated with the computer system 200, a semiconductor based microprocessor (in the form of a microchip or chip set), a macroprocessor, or other device for executing instructions. The processor 205 includes a cache 270, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 270 may be organized as a hierarchy of more cache levels (L1, L2, etc.).

The memory 210 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 210 may incorporate electronic, magnetic, optical, or other types of storage media. Note that the memory 210 may have a distributed architecture, where various components are situated remote from one another but may be accessed by the processor 205.

The instructions in memory 210 may include one or more separate programs, each of which comprises an ordered listing of executable instructions for implementing logical functions. In the example of FIG. 2, the instructions in the memory 210 include a suitable operating system (OS) 211. The operating system 211 essentially may control the execution of other computer programs and provides scheduling, input-output control, file and data management, memory management, and communication control and related services.

Additional data, including, for example, instructions for the processor 205 or other retrievable information, may be stored in storage 220, which may be a storage device such as a hard disk drive or solid state drive. The stored instructions in memory 210 or in storage 220 may include those enabling the processor to execute one or more aspects of the systems and methods of this disclosure.

The computer system 200 may further include a display controller 225 coupled to a display 230. In some embodiments, the computer system 200 may further include a network interface 260 for coupling to a network 265. The network 265 may be an IP-based network for communication between the computer system 200 and an external server, client and the like via a broadband connection. The network 265 transmits and receives data between the computer system 200 and external systems. In some embodiments, the network 265 may be a managed IP network administered by a service provider. The network 265 may be implemented in a wireless fashion, e.g., using wireless protocols and technologies, such as WiFi, WiMax, etc. The network 265 may also be a packet-switched network such as a local area network, wide area network, metropolitan area network, the Internet, or other similar type of network environment. The network 265 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods according to this disclosure may be embodied, in whole or in part, in computer program products or in computer systems 200, such as that illustrated in FIG. 2.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for automatic cognate detection, the method comprising:

stemming, by a processor, a first word in a first language in a bilingual corpus to obtain a first stem and a second word in a second language in the bilingual corpus to obtain a second stem;

calculating, by the processor, a probability for aligning the first stem and the second stem;

normalizing, by the processor, the first stem and the second stem;

calculating, by the processor, a distance metric between the normalized first stem and the normalized second stem identifying, by the processor, the first word and the second word as a cognate pair when the probability and the distance metric meet a threshold criterion;

storing the cognate pair in a set of cognates;

retrieving a candidate sentence in the second language from a corpus;

filtering the candidate sentence by an active vocabulary of a user in the second language and the set of cognates;

calculating a sentence quality score for the candidate sentence; and ranking the candidate sentence for presentation to the user based on the sentence quality score.

2. The method of claim 1, wherein the probability is calculated with a Viterbi algorithm.

3. The method of claim 1, wherein the probability is calculated with an expectation maximization algorithm.

4. The method of claim 1, wherein the distance metric comprises an edit distance.

5. The method of claim 1, wherein calculating the distance metric comprises mapping between characters or groups of characters of the first and second languages, wherein the first language and second language have different alphabets; or phonetic transformation of the first stem and the second stem.

6. The method of claim 1, wherein stemming is performed using predetermined language-specific rules.

7. A system for automatic cognate detection, the system comprising:

a memory having computer readable instructions; and one or more processors for executing the computer readable instructions, the one or more processors being configured to:

stem a first word in a first language in a bilingual corpus to obtain a first stem and a second word in a second language in the bilingual corpus to obtain a second stem;

calculate a probability for aligning the first stem and the second stem;

normalize the first stem and the second stem;

calculate a distance metric between the normalized first stem and the normalized second stem identify the first word and the second word as a cognate pair when the probability and the distance metric meet a threshold criterion;

store the cognate pair in a set of cognates;

retrieve a candidate sentence in the second language from a corpus;

filter the candidate sentence by an active vocabulary of a user in the second language and the set of cognates;

calculate a sentence quality score for the candidate sentence; and rank the candidate sentence for presentation to the user based on the sentence quality score.

8. The system of claim 7, wherein the probability is calculated with a Viterbi algorithm.

9. The system of claim 7, wherein the probability is calculated with an expectation maximization algorithm.

10. The system of claim 7, wherein the distance metric comprises an edit distance.

11. The system of claim 7, wherein calculating the distance metric comprises
   mapping between characters or groups of characters of the first and second languages, wherein the first language and second language have different alphabets; or
   phonetic transformation of the first stem and the second stem.

12. The system of claim 7, wherein stemming is performed using predetermined language-specific rules.

13. A computer program product for automatic cognate detection, the computer program product comprising a computer readable storage medium having program instructions embodied therewith, the program instructions executable by a processor to cause the processor to perform:
   stemming a first word in a first language in a bilingual corpus to obtain a first stem and a second word in a second language in the bilingual corpus to obtain a second stem;
   calculating a probability for aligning the first stem and the second stem;
   normalizing the first stem and the second stem;
   calculating a distance metric between the normalized first stem and the normalized second stem
   identifying the first word and the second word as a cognate pair when the probability and the distance metric meet a threshold criterion;
   storing the cognate pair in a set of cognates;
   retrieving a candidate sentence in the second language from a corpus;
   filtering the candidate sentence by an active vocabulary of a user in the second language and the set of cognates;
   calculating a sentence quality score for the candidate sentence; and
   ranking the candidate sentence for presentation to the user based on the sentence quality score.

14. The computer program product of claim 13, wherein the probability is calculated with a Viterbi algorithm.

15. The computer program product of claim 13, wherein the probability is calculated with an expectation maximization algorithm.

16. The computer program product of claim 13, wherein the distance metric comprises an edit distance.

17. The computer program product of claim 13, wherein calculating the distance metric comprises
   mapping between characters or groups of characters of the first and second languages, wherein the first language and second language have different alphabets; or
   phonetic transformation of the first stem and the second stem.

18. The computer program product of claim 13, wherein stemming is performed using predetermined language-specific rules.

* * * * *